Figure 1:
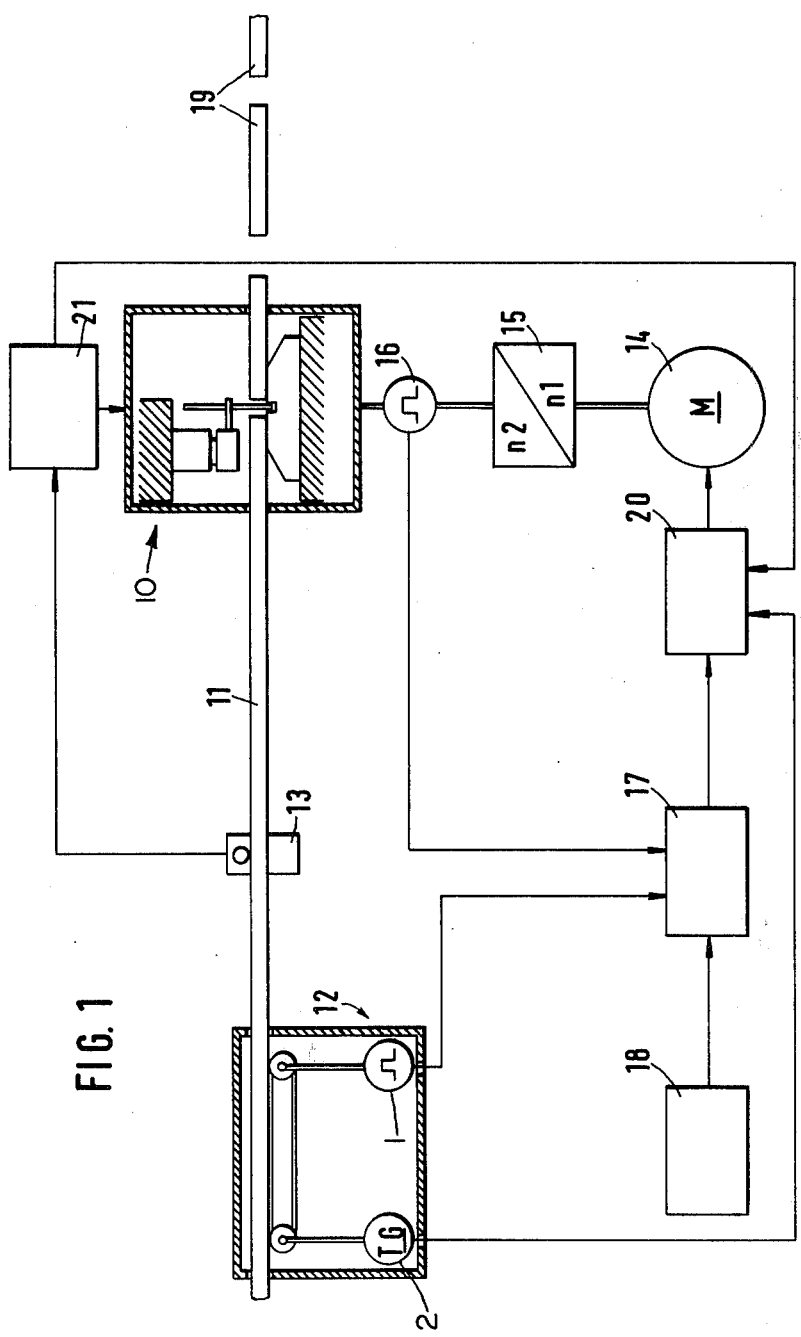

United States Patent [19]
Schneider et al.

[11] 4,114,489
[45] Sep. 19, 1978

[54] DIVIDING MEANS CONTROL DEVICE

[75] Inventors: Franz Schneider; Helmut Braitinger, both of Göppingen; Burkhard Schumann, Ottenbach, all of Germany

[73] Assignee: L. Schuler GmbH, Germany

[21] Appl. No.: 828,095

[22] Filed: Aug. 26, 1977

[30] Foreign Application Priority Data

Aug. 26, 1976 [DE] Fed. Rep. of Germany ....... 2638360

[51] Int. Cl.$^2$ .......................... B26D 1/56; B26D 5/32; B26D 5/34
[52] U.S. Cl. ........................................ 83/298; 83/311; 83/312; 83/365
[58] Field of Search ...................... 83/37, 38, 365, 298, 83/308, 311, 312, 318, 369, 360

[56] References Cited
U.S. PATENT DOCUMENTS

| | | | |
|---|---|---|---|
| 1,910,387 | 5/1933 | Hahn | 83/344 X |
| 3,060,791 | 10/1962 | Tarczy-Hornoch et al. | 83/365 X |
| 3,608,411 | 9/1971 | Schmidt | 83/311 X |
| 3,741,054 | 6/1973 | Alperin et al. | 83/360 X |

*Primary Examiner*—Willie G. Abercrombie
*Attorney, Agent, or Firm*—Craig & Antonelli

[57] ABSTRACT

A control arrangement for a dividing apparatus for dividing or cutting continuously fed strip stock of variable thickness. The dividing apparatus includes a drive arrangement for driving a cutting unit in a horizontal and vertical direction with an arrangement being provided for vertically adjusting the height of the cutting unit. A control arrangement is provided which includes a measuring device arranged in the dividing apparatus at a position upstream of the cutting unit, as viewed in the feed direction of the strip stock, with the measuring device dividing an output signal indicative of the measured thickness of the strip stock, which output signal is directed to control elements so as to correlate the speed of the drive arrangement and adjust the height of the cutting unit between minimum and maximum values in correspondence with the measure thickness of the strip stock.

12 Claims, 2 Drawing Figures

DIVIDING MEANS CONTROL DEVICE

The present invention relates to a control device for a dividing or cutting apparatus for continuously fed strip stock of varying thicknesses with the dividing or cutting apparatus including a speed-adjustable drive means for a horizontal and vertical movement and an adjustment means for adjusting a vertical height.

Control devices for dividing or cutting apparatus have been proposed, for example, in U.S. Pat. No. 3,267,781 wherein roll shears are provided for cutting or severing continuously fed strip stock. In the patented construction, a drive of the dividing apparatus is controlled as a function of the feed rate of the strip stock in such a manner that sections of strip of equal length are produced by the dividing means. A dividing apparatus of this type is suitable for processing strip stock of approximately constant thicknesses such as, for example, paper, cardboard and the like. However, a disadvantage of this proposed apparatus resides in the fact that it is not suitable for processing continuously fed strip stock of varying thicknesses and which is composed of, for example, mineral fiber or foam.

For processing of continuously fed strip stock of mineral material, foam, or the like, a dividing or cutting apparatus is proposed in commonly assigned U.S. patent application Ser. No. 824,741, filed Aug. 15, 1977, entitled Strip Material Dividing Device (corresponding to German patent application No. P 26 36 738.4), the disclosure of which is incorporated herein by reference to the extent necessary in understanding the present invention. In this proposed dividing apparatus, an articulated drive for a lifting motion of the cutting unit is provided with the drive consisting of a four-bar linkage which includes a driven crank pivotally connected to a coupling member which, in turn, is pivotally connected to a rocker lever or oscillating crank. The rocker lever includes an extension portion extending beyond the pivotal connecting point with the coupling member with a free end of the extension portion being connected to a link or connecting member which, in turn, is connected to a secondary drive or output lever. The secondary drive or output lever is constructed as a single- or double-armed lever and is connected with a transmission link which, in turn, is connected to a cutting or severing unit. The secondary drive lever is adjustably pivoted directly or indirectly by way of a double-armed lever with the transmission link. The rocker lever, extension portion, and connecting member assume an extended position over a first approximately 180° rotation of the driven crank and are pivoted out of the extended position during a second approximately 180° rotation of the driven crank whereby, during an entire rotation of the crank, the rocker lever, extension portion, connecting member, and secondary drive lever can be located outside of the extended position.

The aim underlying the present invention essentially resides in providing a control device for a dividing or cutting apparatus of the type described hereinabove, which control device provides a control for a height and speed of the dividing or cutting means as a function of a thickness of the continuously fed strip stock to be severed.

According to one advantageous feature of the present invention, a measuring means for measuring the thickness of the strip stock is connected upstream of the cutting or dividing unit with the measured thickness reflecting guide parameters which form the basis of control signals to the control device whereby the height and speed of the cutting or dividing means is adjusted in both directions of movement between minimum and maximum values which correspond to the varying thicknesses of the strip material to be severed.

According to another feature of the present invention, the measuring means is constructed as a photoelectric detecting device which includes means for projecting a light curtain and a reflector mounted in a field of the light curtain with the reflector and projecting means extending parallel to a feed plane of the continuously fed strip stock so as to provide a light curtain extending transverse to a feed direction of the strip stock.

According to a still further feature of the present invention, a protective cover is provided for shielding a work area of the dividing means with the protective cover being operatively connected with the control device so as to adjust the protective cover to correspond to the thickness of the strip stock being cut or severed in response to control signals received from the measuring device.

By virtue of the constructional features of the present invention, a control device is provided which ensures an optimally adjusted operation of the dividing or cutting means at the continuously fed strip stock to be cut or severed with the control device taking into account structurally determined limiting values of moving parts of the cutting apparatus. The limiting values of the moving parts of the cutting apparatus are determined by a maximum thickness and speed of the continuously fed strip stock and by a resultant minimum-weight dimensioning of the moving parts of the dividing or cutting means.

Accordingly, it is an object of the present invention to provide a control device for a dividing or cutting apparatus which avoids by simple means the shortcomings and drawbacks encountered in the prior art.

Another object of the present invention resides in providing a control device for a dividing or cutting apparatus which is relatively simple in construction and therefor inexpensive to manufacture.

A still further object of the present invention resides in providing a control device for a dividing or cutting apparatus which functions reliably under all operating conditions with continuously fed strip stock of varying thicknesses.

Yet another object of the present invention resides in providing a control device for a dividing or cutting apparatus which is readily adaptable to precisely cut or severed materials of varying thicknesses.

Figure 2:
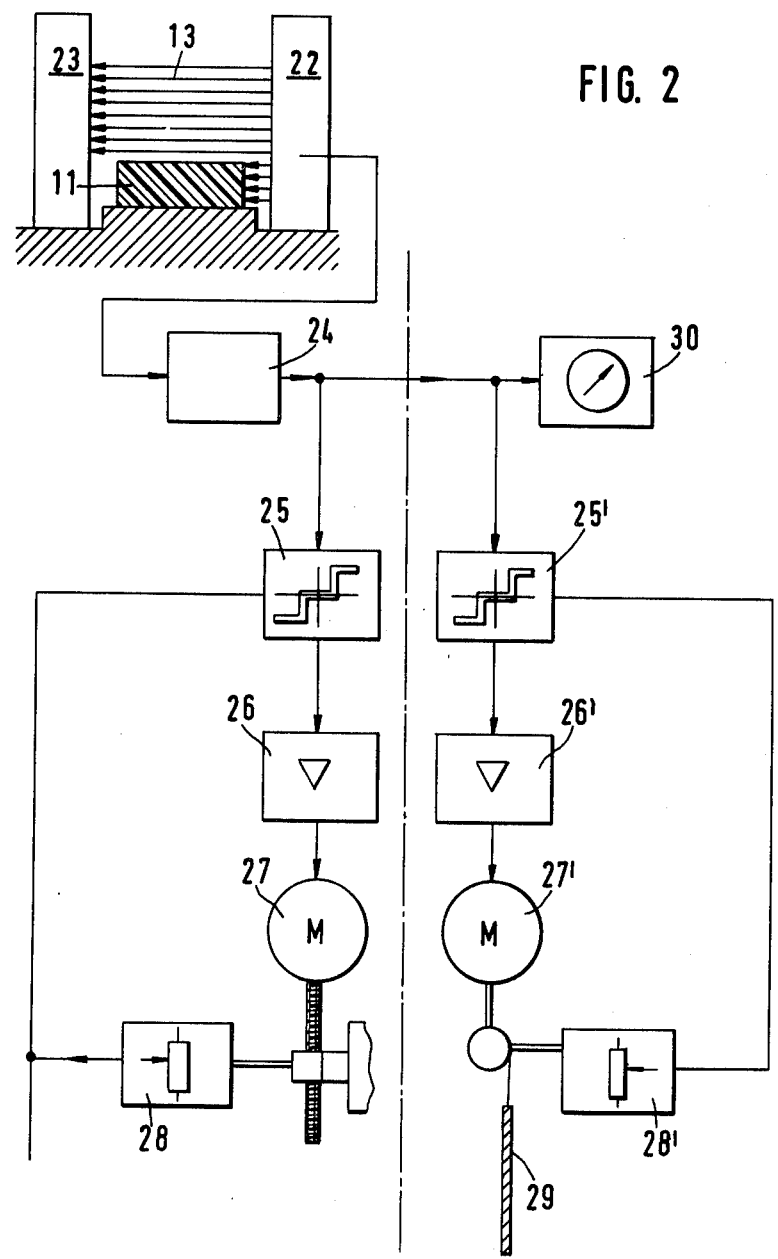

These and other objects, features, and advantages of the present invention will become more apparent from the following description when taken in connection with the accompanying drawings which show, for the purposes of illustration only, one embodiment in accordance with the present invention, and wherein:

FIG. 1 is a partial cross-sectional schematic view of a dividing or cutting apparatus with a control drive in accordance with the present invention; and FIG. 2 is a partial cross-sectional schematic view of a control device for a height adjustment of the dividing or cutting means in accordance with the present invention.

Referring now to the drawings wherein like reference numerals are used in both views to designate like parts and, more particularly, to FIG. 1, according to this figure, a cutting or dividing means generally designated by the reference numeral 10 is provided for cutting continuously fed strip stock 11 made of, for example, mineral fiber, foam, etc. The cutting or dividing means may be of the type disclosed, for example, in the aforementioned U.S. patent application Ser. No. 824,741 or U.S. Pat. No. 3,964,357.

A distance and speed measuring device generally designated by the reference numeral 12 and a strip stock thickness measuring device 13 are arranged upstream of the dividing or cutting means 10, as viewed in the feed direction of the strip stock 11. The distance and speed measuring device may be of a conventional construction and includes, for example, an incremental pulse generator 1 which generates pulses proportional to a length of material traversing the device 12 and a tachometer generator 2 which provides output signals indicative of the speed of the feed of the strip stock 11.

The dividing or cutting means 10 is driven by a motor 14 and a drive 15 which includes a gear system having a predetermined input-output ratio of $n_1/n_2$ so as to define a drive threshold or drive range for the dividing or cutting means 10.

To determine and control the length of travel or cutting path of the dividing or cutting means 10, a distance measuring device 16 is provided which is constructed as a conventional incremental pulse generator providing output pulses proportional to a value indicative of the length of travel of the dividing or cutting means 10.

A control circuit for the drive motor 14 is provided and includes a position control means 17 and a drive control means 20. The position control means 17 is constructed as a comparator device and receives output signals from the incremental pulse generators 1, 16 and from a preselected device 18. The preselected device 18 provides an output signal to the position control means, which output signal reflects a predetermined or preselected length into which the strip stock 11 is to be cut so as to form cut or divided sections 19 from the stock 11.

The output signals from the incremental pulse generators 1, 16 provide signals of actual distance values which are then compared in the position control means 17 with the preselected value obtained from the preselected device 18 so that the position control means 17 provides appropriate control output signals to the drive control means 20 which, in turn, controls the drive motor 14 so as to ensure the cutting or severing of the sections 19 into the preselected lengths.

The drive control means is constructed in a known manner as a motor speed controller and may take the form of a thyristor-controller current regulator controlling the current supplied to the drive motor 14 in a manner disclosed more fully, for example, in U.S. Pat. No. 3,267,781.

A height adjusting means 21 for adjusting the height of the cutting or dividing means 10 is provided and is operatively connected with a strip stock thickness measuring means 13 whereby the height of the dividing or cutting means 10 is continuously adjustable as a function of the thickness of the continuously fed strip stock 11. The height adjusting means 21 provides an output signal to the drive control means 20, which output signal reflects a set height of the cutting or dividing means 10. The measuring of the thickness of the strip stock 11 ensures the assignment of a maximum speed to each height adjustment or setting of the dividing or cutting means 10, thereby avoiding damage to the dividing or cutting means which would otherwise result due to excessive acceleration forces.

By virtue of the above described arrangement of the present invention and the dimension control provided thereby, the cutting or dividing means 10 cuts or divides the continuously fed strip stock 11 into lengths or sections 19 set in the preselected device 18 during one synchronous movement segment of the cutting or dividing means 10.

As shown most clearly in FIG. 2, the measuring means 13 for measuring the thickness of the continuously fed strip stock 11 is constructed as an optical thickness measuring device which includes a light curtain 22 and a reflector 23 which are mounted parallel to a feed plane or feed direction of the continuously fed strip stock 11 facing each other so that the light curtain 22 extends transversely of the feed direction of the stock 11. The measuring means 13 is disposed upstream of the dividing or cutting means 10, as viewed in the feed direction of the stock 11, and is preferably arranged between the distance and speed measuring device 12 and the cutting or dividing means 10.

The measuring means 13 provides an output signal indicative of the measured thickness of the strip stock 11 to an evaluator comparator device 24 connected downstream of the measuring means 13. The evaluator comparator device 24 is provided for accounting for occasional minor variations which may occur in the strip stock, which minor variations would not necessarily require a change in the height adjustment of the cutting or dividing means 10.

The device 24 provides an output signal to height adjusting means and may, for example, include a circuit which forms, from the output signal of the measuring means 13, a predetermined voltage by stabilizing and amplifying the received output signal so as to provide an output signal, indicative of a governing magnitude or desired value, to a height adjusting controller 25. The evaluating comparator device 24 may be constructed as, for example, a voltage amplifier.

The height adjusting controller 25 controls an operation of a servomotor 27 through a switching amplifier 26 with the servomotor providing an appropriate height adjustment of the cutting or dividing means 10 corresponding to the thickness of the strip stock 11. The height adjusting controller 25 is a three-position or three-term controller with the symbol illustrated in the drawing representing the response threshold thereof.

A measuring system 28 is provided for detecting the set amount of the height of the cutting or dividing means, which measuring system provides a feedback or output signal to the height adjusting controller 25. Additionally, the value measured or determined by the measuring system is fed back by way of an output pulse to the drive control means 20. The measuring system may be constructed as, for example, a potentiometer.

Covers 29 are provided at inlet and outlet sections of the cutting or dividing means 10 at least within the area of the cutting tools thereof. Such covers are necessary since, if the cutting or dividing means 10 is a flying saw and is employed to cut or divide strip stock of mineral fiber or the like, there is a considerable production of sawdust which must be localized. However, the covers 29 must also be adjustable so as to correspond to the height of the cutting and dividing means 10, which height matches the thickness of the strip stock 11 in order to ensure that the strip stock 11 will enter and leave the dividing means in a smooth fashion. For this purpose, the covers 29, like the height adjustment means 21, are adjusted by a servomotor 27' which is controlled through a switching amplifier 26' by a height controller 25' corresponding to the height controller 25. A measuring system 28', corresponding to the measuring system 28, detects the set height of the covers and feeds the set value back to the controller means 25. An indicator 30 connected to the evaluator comparator device 24 displays the thickness of the strip stock 11 as determined by the measuring device 13.

While we have shown and described only one embodiment in accordance with the present invention, it is understood that the same is not limited thereto but is susceptible of numerous changes and modifications as known to one skilled in the art and we therefore do not wish to be limited to the details shown and described herein but intend to cover all such modifications as are encompassed by the scope of the appended claims.

We claim:

1. A control arrangement for a variable thickness continuously fed strip stock dividing apparatus, the dividing apparatus including a drive means for driving a cutting means in a horizontal and a vertical direction, and means for effecting a vertical height adjustment of the cutting means, the control arrangement comprising: means for measuring a thickness of the variable thickness continuously fed strip stock and for providing an output signal indicative of a measured thickness of the strip stock, said measuring means being arranged in the dividing apparatus at a position upstream of the cutting means, as viewed in a feed direction of the strip stock, means operatively connected with said measuring means for controlling a speed of the driving means in response to a predetermined output signal from said measuring means, and means operatively connected with said measuring means for adjusting a height of the cutting means in response to a predetermined output signal from said measuring means whereby said measuring means correlates the speed of the driving means and height of the cutting means between minimum and maximum values in correspondence with the measured thickness of the strip stock.

2. An arrangement according to claim 1, wherein said measuring means includes a means for providing a light curtain and a reflector means, said light curtain means and said reflector means being arranged opposite one another and extending in a direction parallel to the feed direction of the strip stock such that the light curtain extends transversely to the strip stock.

3. An arrangement according to claim 2, wherein said cutting means includes at least one cutting tool arranged in a work compartment, means are provided for covering a strip stock inlet and a strip stock outlet of the work compartment, and wherein means operatively connected with said measuring means are provided for adjusting a height of at least one of the covering means in accordance with the measured thickness of the strip stock.

4. An arrangement according to claim 3, wherein a distance-speed measuring means is arranged upstream of the measuring means, as viewed in the feed direction of the strip stock, for measuring a feeding speed and a traversed distance of the strip stock and for providing an output signal indicative of the measured speed and distance tranversed by the strip stock, said output signal indicative of the measured speed and distance traversed being fed to said speed controlling means.

5. An arrangement according to claim 4, wherein said distance-speed measuring means includes a tachometer generator means for providing the signal indicative of the speed of the strip stock, and an incremental pulse generator means for providing the signal indicative of the distance traversed by the strip stock.

6. An arrangement according to claim 5, wherein means are provided for preselecting a length into which the strip stock is to be cut and for providing a signal indicative of a selected length, a comparator means is interposed between said preselecting means and the speed controlling means with said signal from said preselecting means being fed to said comparator means, and wherein said signal from said tachometer generator means is fed to said comparator means and compared with the signal from said preselecting means with said comparator means providing a predetermined control output signal to said speed controlling means.

7. An arrangement according to claim 6, wherein a further distance measuring means is operatively connected with said cutting means for measuring a travel distance of the cutting tool and for providing an output signal indicative of the measured travel distance, said last-mentioned output signal being fed to said comparator means.

8. An arrangement according to claim 1, wherein said cutting means includes at least one cutting tool arranged in a work compartment, means are provided for covering a strip stock inlet and a strip stock outlet of the work compartment, and wherein means operatively connected with said measuring means are provided for adjusting a height of one of the covering means in accordance with the measured thickness of the strip stock.

9. An arrangement according to claim 1, wherein a distance-speed measuring means is arranged upstream of the measuring means, as viewed in the feed direction of the strip stock, for measuring a feeding speed and distance traversed by the strip stock and for providing an output signal indicative of the measured speed and distance traversed by the strip stock, said output signal indicative of the measured speed and distance traversed being fed to said speed controlling means.

10. An arrangement according to claim 9, wherein said distance speed measuring means includes a tachometer generator means for providing the signal indicative of the speed of the strip stock and an incremental pulse generator means for providing the signal indicative of the distance traversed by the strip stock.

11. An arrangement according to claim 10, wherein means are provided for preselecting a length into which the strip stock is to be cut and for providing a signal of a selected length, a comparator means is interposed between said preselecting means and the speed controlling means with said signal from said preselecting means being fed to said comparator means, and wherein said signal from said tachometer generator means is fed to said comparator means and compared with the signal from said preselecting means with said comparator means providing a predetermined control output signal to said speed controlling means.

12. An arrangement according to claim 1, wherein a distance measuring means is operatively connected with said cutting means for measuring a travel distance of the cutting tool and for providing an output signal indicative of the measured travel distance, said last-mentioned output signal being fed to said speed controlling means.

* * * * *